April 15, 1952  H. A. MAGNUSSEN ET AL  2,593,323
COLLAPSIBLE SAW FRAME
Filed Feb. 19, 1948

INVENTOR.
HERMAN A. MAGNUSSEN
ERLING JOHANSEN
BY
ATTORNEY

UNITED STATES PATENT OFFICE 2,593,323

COLLAPSIBLE SAW FRAME

Herman Anker Magnussen and Erling Johansen, Kristiansand, Norway, assignors to Osmund Stray, Forest Hills, N. Y.

Application February 19, 1948, Serial No. 9,376
In Norway February 24, 1947

2 Claims. (Cl. 145—33)

The improvements relate primarily to saws adapted and intended to be used for the usual purposes of such tools, and more particularly to saws comprising a collapsible frame in which the saw blade is removably mounted. They may be adapted, however, to other purposes, and embodied in devices of different sizes.

Among the objects of the improvements are the provision of a saw frame and blade which can be quickly and easily assembled and without the need for applying or adjusting nuts, bolts, set screws or other positioning, fastening or tensioning means, and which when so assembled will be securely held in position and in operating relation of the parts. The improvements also provide a frame which may be used with saws of various kinds and for many specific purposes, each saw blade being quickly removed and replaced, and as often as may be desired, with only a simple manipulation of the parts, so that but one frame or handle need be used with many blades.

Other uses and advantages will be apparent from the following description and the accompanying drawings.

In the said drawings.

The rigid substantially diagonal frame member 1 is preferably bent or curved at two places, 6 and 7, and has an elongated eye 8' in its enlarged approximately horizontal extremity 8 through which the flattened upright arm or frame member 2 passes. These parts are of strong steel or other metal and the body of the member 7 is preferably of a gauge sufficiently light to enable it to pass through the cut made in a board or the like when the blade is employed to make a relatively long cut.

Figure 1:
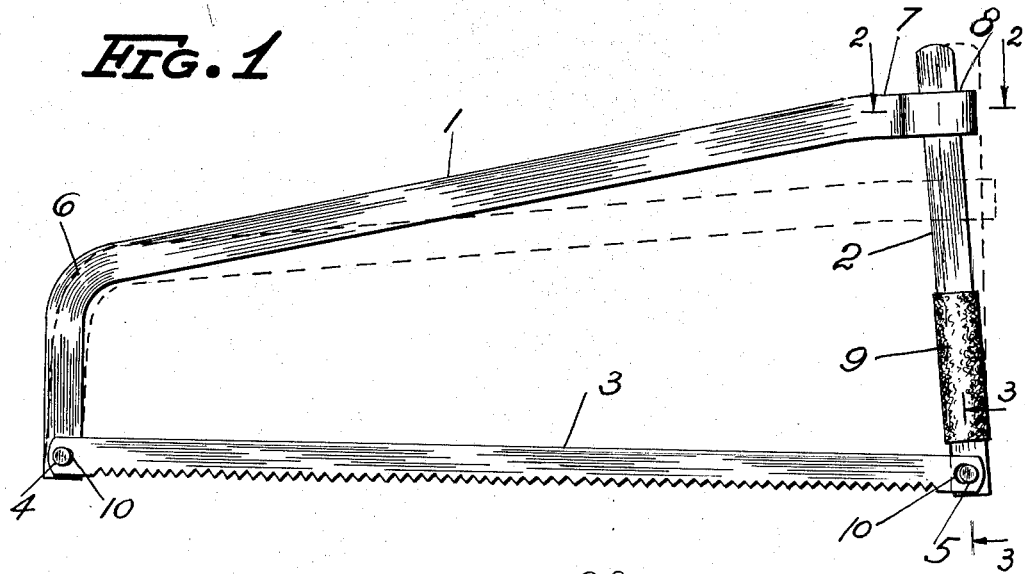
Fig. 1 is a side view of an assembled saw embodying the improvements.
Figure 2:
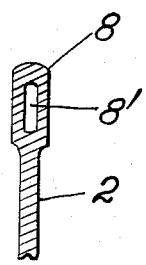
Fig. 2 is a medial horizontal section of the upper end of the top diagonal frame member on the line 2—2 of Fig. 1.
Figure 3:
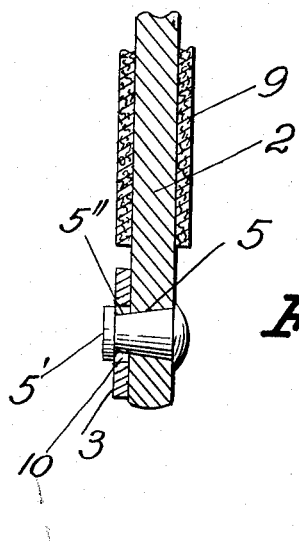
Fig. 3 is a medial vertical section of the upright frame member on the line 3—3 of Fig. 1, showing blade holding means.

The extremity 8 of member 1 is so turned that in a lower position (shown in broken lines in Fig. 1) when the saw is being assembled the walls of its eye 8' are approximately parallel with the upper portion of the upright member 2 passed therethrough, so that said upper portion can slide freely therein for a short distance and until the outward movement of member 1 on an arc described by the radius drawn from its opposite end causes a wedging and binding action between eye 8' and member 2 and an outward thrust of the lower ends of 1 and 2, producing tension on the saw blade mounted and positioned on the ends of the frame members and spanning the space between them. This securely connects and unites the frame members and blade in operative positions with the blade under proper tension, and prevents them from separating under all the strains of use, by frictional coaction and without the need for clamps, set screws, bolts or other fastening means.

The operating hand grip 9 on the member 2 is in the form of a sleeve surrounding its lower part, and may be composed of leather, rubber, plastic or other suitable material. It is spaced a sufficient distance from the upper end of that member so that the said member may slide through the eye 8' to unite and release the frame members and blade, and acts as a stop to limit and gauge the upward movement of 2 or downward movement of 1. It is also adjacent to but spaced a sufficient distance from the lower end of 2 to allow saw blades of varying width to be mounted thereon and have flat contact therewith.

The eye 8' fits over and conforms to the shape of arm 2 with reasonable snugness but is slightly longer than the width of the latter when it is in position approximately normal to the part 8, so as to allow a limited longitudinal swinging movement of 2 therein to accommodate slight variations in the length of the blades to be mounted on its lower end. The portion of arm 2 adapted to slide in eye 8' is rectilinear.

The saw blade 3, which may be of a cross-cut, rip, hack or other type, is mounted by means of eyes 10 near its ends on studs or blade holding means 4 and 5 securely fixed in the lower ends of the frame members 1 and 2 respectively and is firmly held thereon under tension by the relative binding movement of the said frame members above described, and is released therefrom by the reverse movement.

The studs 4 and 5 have shallow annular grooves 5" adjacent the faces of the frame member in which they are fixed and slight enlargements 5' at their extending extremities. This causes the margins of the eyes 10, which are very slightly greater in diameter than the greatest diameter of the projecting portions of the studs, to slip into the said grooves when tension is exerted on the blade and to be held securely in said grooves, with the inner surrounding surfaces of the blades in contact with the surfaces of the frame members adjacent the studs, and to remain in this position so long as the tension is maintained.

To assemble the saw and frame, the upper end of member 2 is passed through the eye 8' until the under side of 8 is in contact with the upper side of grip 9. The blade 3 is then placed on the studs 4 and 5 by passing its eyes over the said studs. Member 2 is then forced downwardly, as by tapping it with a hammer, or member 1 is forced outwardly, to increase the distance between the studs, seat and bind the blade thereon and place it under tension. This may also be done by tapping the outer end of 2 against a tree, floor or post while holding member 1 in the hand, and in various other ways. In this position a perpendicular dropped from the stud 4 onto the arm 2 strikes the latter between the stud 5 and the eye 8'. To disassemble the saw it is only necessary to force the member 1 downwardly on member 2, as by tapping it with a hammer, mallet or other solid, relatively heavy article at the part 8 while holding the member 2 by the hand grip 9. Or the member 2 can be provided with a short extension beyond the stud 5 and the blade, which can be tapped against some fixed object while holding the part 1 in the hand.

From the foregoing it will be seen that the improvements provide a saw and two-part frame—of the knock-down type—which may be carried about or stored in a small sheath or case of canvas or the like, with many blades and of different types, and assembled or disassembled without the use or manipulation of any fastening means, or even a tool of any kind; that this can be done in a fraction of a minute; and which is as strong and dependable when set up as a permanently assembled device of the kind; and that one frame can be used with one or more blades designed for all ordinary purposes.

While we have shown and described what we consider the preferred embodiment of our invention, modifications may be made without departing from its spirit, and reference is, therefore, made to the appended claims for a definition of the scope of our invention.

What we claim is:
1. A collapsible saw frame comprising a one piece frame member having blade holding means at one end and an eye at the opposite end, an arm having adjacent to one end a rectilinear portion slideable in said eye, and other blade holding means at the opposite end of said arm, said blade holding means being adapted to hold a saw blade between them, said frame member being so constructed and arranged that with a saw blade held between said blade holding means a perpendicular dropped from said first named blade holding means onto said arm strikes said arm between the portion of said arm disposed in said eye and said other blade holding means.

2. In the combination of claim 1, handle means attached to said arm adjacent to said other blade holding means.

HERMAN ANKER MAGNUSSEN.
ERLING JOHANSEN.

REFERENCES CITED

The following references are of record in the file of this patent:

UNITED STATES PATENTS

| Number | Name | Date |
|---|---|---|
| 558,137 | Williams | Apr. 14, 1896 |
| 806,515 | Baumgartner | Dec. 5, 1905 |
| 1,245,545 | Williams | Nov. 6, 1917 |
| 1,500,406 | McIntire | July 8, 1924 |
| 1,713,972 | Lufkin | May 21, 1929 |
| 1,835,638 | Cunneen | Dec. 8, 1931 |
| 1,949,196 | Youlten | Feb. 27, 1934 |
| 2,148,734 | Du Jat | Feb. 28, 1939 |

FOREIGN PATENTS

| Number | Country | Date |
|---|---|---|
| 155,223 | Germany | Oct. 22, 1904 |
| 433,018 | France | Oct. 17, 1911 |
| 523,105 | France | Apr. 13, 1921 |